United States Patent [19]

Morrison

[11] Patent Number: 6,064,394
[45] Date of Patent: May 16, 2000

[54] TEXTURE MAPPING USING A PLANE NORMAL TO A SELECTED TRIANGLE AND USING A (U,V) ORIGIN THEREOF TO PRESERVE TEXTURE SIZE UPON SURFACE SCALING

[75] Inventor: Scott C. Morrison, San Rafael, Calif.

[73] Assignee: Autodesk, Inc., San Rafael, Calif.

[21] Appl. No.: 08/962,068

[22] Filed: Oct. 31, 1997

[51] Int. Cl.[7] .................................................. G06T 15/00
[52] U.S. Cl. ........................................... 345/430; 345/425
[58] Field of Search ...................................... 345/430, 425

[56] References Cited

U.S. PATENT DOCUMENTS

| | | | |
|---|---|---|---|
| 5,107,444 | 4/1992 | Wu ........................................... | 345/419 |
| 5,179,638 | 1/1993 | Dawson et al. ........................... | 345/425 |
| 5,224,208 | 6/1993 | Miller Jr. et al. ........................ | 345/425 |
| 5,255,352 | 10/1993 | Falk ........................................ | 345/425 |
| 5,369,736 | 11/1994 | Kato et al. ............................... | 345/425 |
| 5,448,687 | 9/1995 | Hoogerhyde et al. ................... | 345/425 |
| 5,550,960 | 8/1996 | Shirman et al. ......................... | 345/430 |
| 5,673,377 | 9/1997 | Berkaloff ................................. | 345/430 |
| 5,870,094 | 2/1999 | Deering ................................... | 345/419 |
| 5,886,703 | 3/1999 | Mauldin ................................... | 345/423 |
| 5,903,270 | 5/1999 | Gentry et al. ............................ | 345/419 |

OTHER PUBLICATIONS

Gueng et al., Constructing Hierarchies for Triangle Meshes, IEEE Transaction on Visualization and Computer Graphics, vol. 4, Issue 2, Apr.–Jun. 1998, pp. 145–161.

Shirman et al., Fast and Accurate Texture Placement, IEEE Computer Graphics and Applications, vol. 17, Issue 1, Jan.–Feb. 1997, pp. 60–66.

*Primary Examiner*—Mark K. Zimmerman
*Assistant Examiner*—Albert K. Lee
*Attorney, Agent, or Firm*—Gates & Cooper

[57] ABSTRACT

A method, apparatus and article of manufacture for (U,V) texture mapping of object surfaces in a 3D graphics system in such a way that the size of the texture is preserved, and the texture wraps around curved surfaces, even when the surface is scaled. One or more triangles are selected from an arbitrary mesh of triangles. A plane normal and a (U,V) origin of the plane normal is determined for each selected triangle. The surface of the selected triangle is texture mapped using the plane normal and the (U,V) origin.

45 Claims, 2 Drawing Sheets

TEXTURE MAPPING USING A PLANE NORMAL TO A SELECTED TRIANGLE AND USING A (U,V) ORIGIN THEREOF TO PRESERVE TEXTURE SIZE UPON SURFACE SCALING

BACKGROUND OF THE INVENTION

1. Field of the Invention.

This invention relates in general to three-dimensional (3D) computer aided design (CAD) systems, and more particularly, to a method, apparatus and article of manufacture for generating a (U,V) texture mapped surface.

2. Description of Related Art.

The use of texture mapping to enhance surface details on computer-generated images is well known in the art. A texture is a two-dimensional (2D) image to be mapped onto a computer-generated 3D object. Each point on the 3D object is associated with a point on the 2D texture.

In prior art 3D graphics systems, the surfaces of 3D objects are texture mapped in such a way that the 2D texture is altered as the surface of the 3D object is altered. For example, as a surface is scaled, the texture of the surface is similarly scaled. Often, this results in unwanted effects. Further, such scaling of the texture may change whether the texture conforms to the curves of the surface.

Thus, there is a need in the art for improved texture mapping techniques.

SUMMARY OF THE INVENTION

To overcome the limitations in the prior art described above, and to overcome other limitations that will become apparent upon reading and understanding the present specification, the present invention discloses a method, apparatus and article of manufacture for (U,V) texture mapping of object surfaces in a 3D graphics system in such a way that the size of the texture is preserved, and the texture wraps around curved surfaces, even when the surface is scaled. One or more triangles are selected from an arbitrary mesh of triangles. A plane normal and a (U,V) origin of the plane normal is determined for each selected triangle. The surface of the selected triangle is texture mapped using the plane normal and the (U,V) origin.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention provides a technique for texture mapping objects in a 3D graphics system in such a way that the size of the texture is preserved, and the texture wraps around curved surfaces, even after scaling the surface. For example, consider a 3D graphics system that generates an image representing an S-shaped brick wall that is represented as being 10 feet in height. The mapper of the present invention positions the bricks along the wall, conforming to the curves. If the wall is then scaled to 20 feet high, the mapper of the present invention creates more bricks. Previous techniques, however, would just scale the existing bricks to be twice as high.

Hardware Environment

Figure 1:
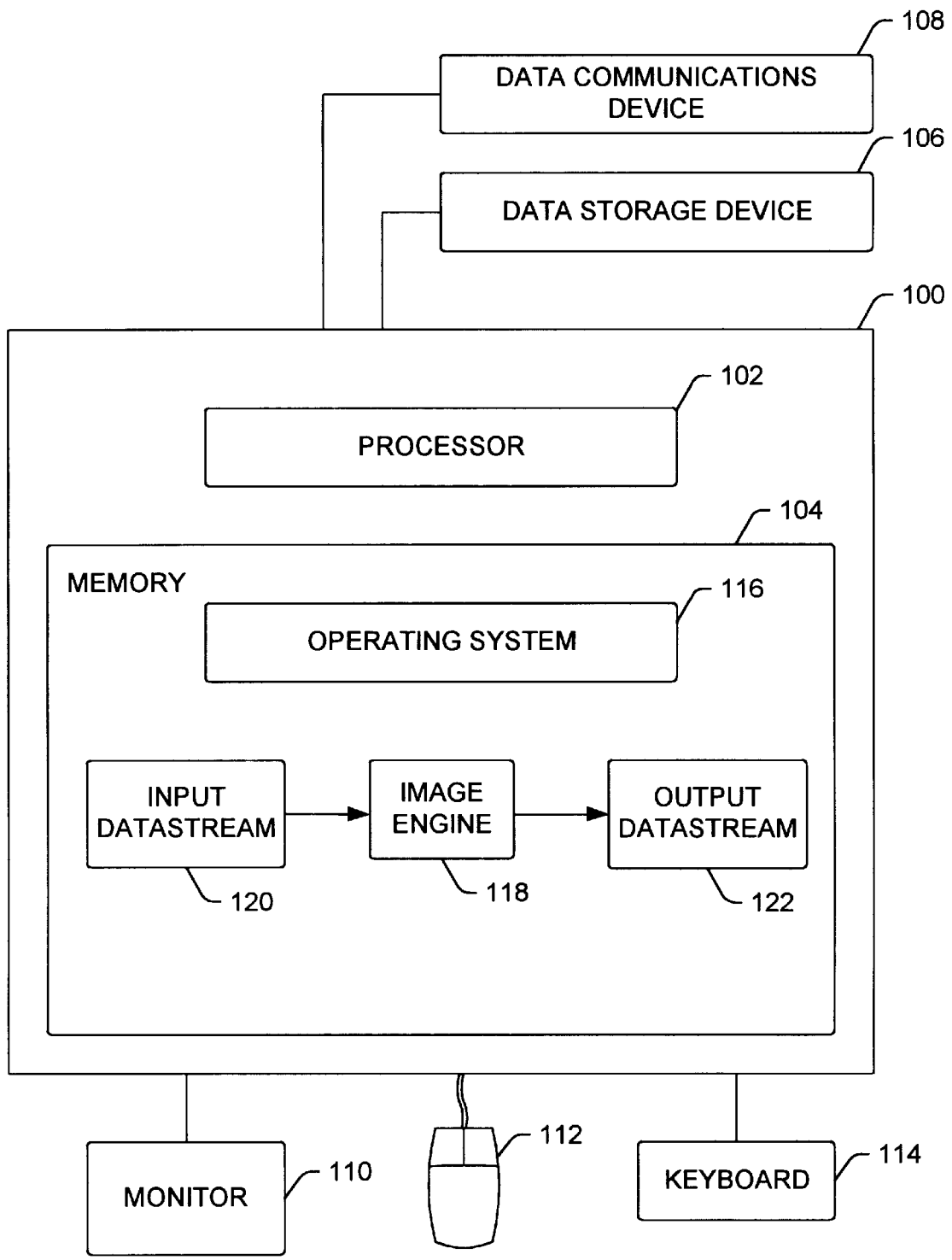
FIG. 1 illustrates an exemplary computer hardware environment that could be used with the present invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112, and keyboard 114. It is envisioned that attached to the computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 operates under the control of an operating system (OS) 116, such as WINDOWS (NT, 95, or 3.1), OS/2, UNIX, etc. The operating system 116 is booted into the memory 102 of the computer 100 for execution when the computer 100 is powered-on or reset. In turn, the operating system 116 then controls the execution of one or more computer programs 118 by the computer 100. The present invention is generally implemented in the computer program 118, although the present invention may be implemented in the operating system 116 itself.

The computer program 118 comprises an image engine 118 that accepts an input datastream 120 and creates an output datastream 122 therefrom. The image engine 118 accepts an arbitrary mesh of triangles from the input datastream 120 and then generates texture vertices and texture faces that preserve scale and wrap around the curved, vertical mesh as an output datastream 122.

The operating system 116, image engine 118, input datastream 120, and output datastream 122 are comprised of instructions and/or data which, when read, interpreted and/or executed by the computer 100, causes the computer 100 to perform the steps necessary to implement and/or use the present invention. Generally, the operating system 116, image engine 118, input datastream 120, and output datastream 122 are tangibly embodied in and/or readable from a device, carrier, or media, such as memory 102, data storage devices 106, and/or remote devices (not shown) connected to the computer 100 via the data communications devices 108. Under control of the operating system 116, the image engine 118, input datastream 120, and output datastream 122 may be loaded from the memory 102, data storage devices 106, and/or remote devices into the memory 102 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs accessible from any device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Operation

Figure 2:
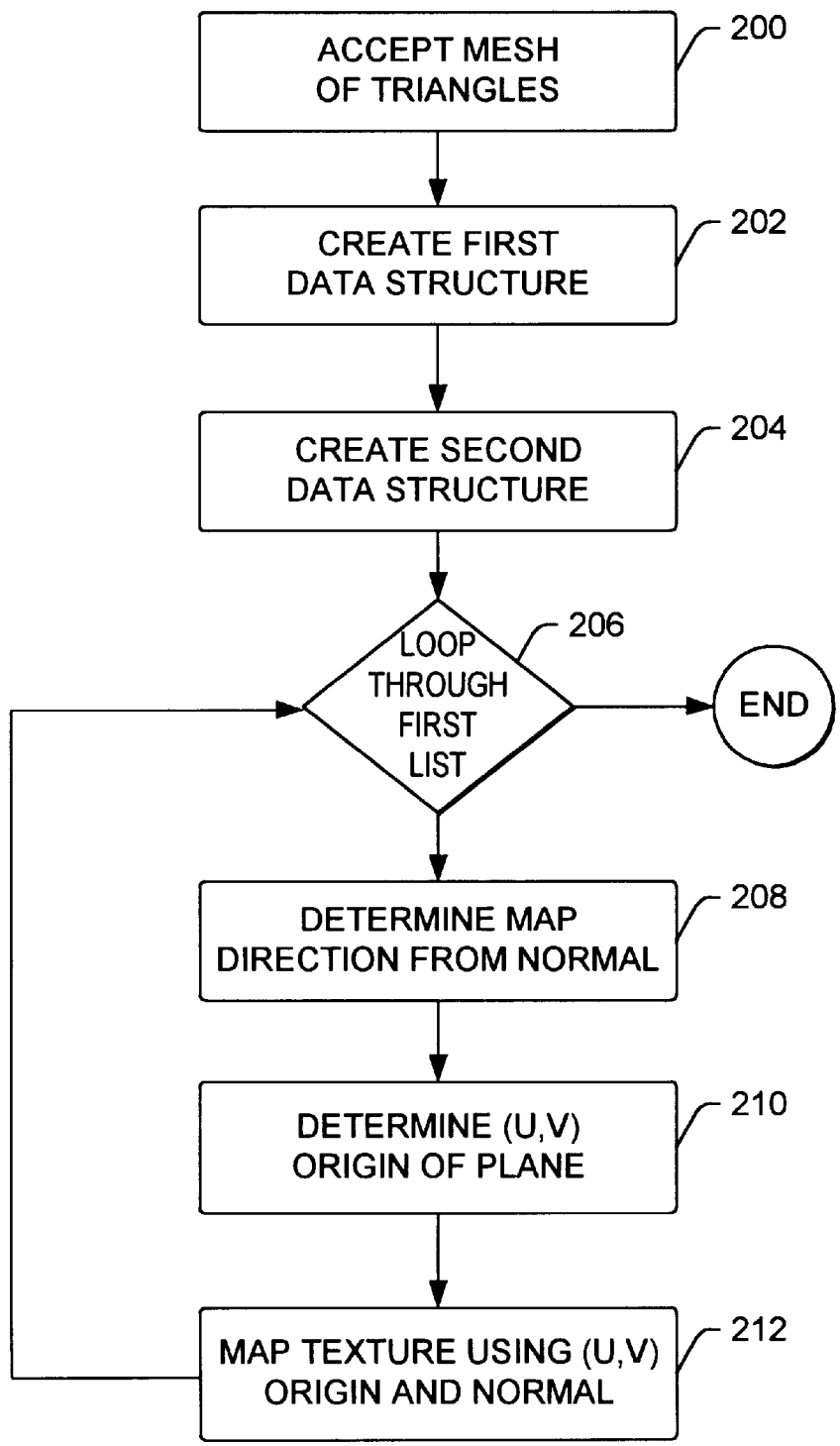
FIG. 2 is a flowchart that illustrates the logic of an exemplary embodiment of the present invention.

The operation of the present invention is described with reference to FIG. 2, which illustrates the logic of an exemplary embodiment of the present invention.

Block 200 represents the image engine 118 accepting an arbitrary mesh of triangles from the input datastream 120.

Block 202 represents the image engine 118 creating a first data structure comprising a collection of distinct sets of co-planar triangles from the arbitrary mesh of triangles. This step partitions the object represented by the arbitrary mesh of triangles into distinct planes that need to be texture mapped. These sets are created by computing a face normal and a constant for a plane equation for each triangle. A fast hashing technique is used to decide if the face normals are approximately equal, wherein the hashing technique uses a hash table for the face normals along with a hash function.

Block 204 represents the image engine 118 creating a second data structure that maps the vertices of the arbitrary mesh of triangles into the first data structure. The second data structure is actually comprised of two inter-mixed doubly-linked lists and a singly-linked list. The first list is a list of triangles that have yet to be processed, the second is a list of other triangles that share the vertex, and the third is a list of the other triangles in the same plane.

Blocks 206–212 represent the image engine 118 assigning texture vertices to the distinct planes.

Block 206 is a decision block that represents the image engine 118 looping through all the triangles in the first list, i.e., the list of triangles that have yet to be processed. The second list of vertices that have been previously mapped is used to determine the next available triangle to process in the loop by giving preference to triangles that share a vertex with a previously processed triangle.

Block 208 represents the image engine 118 using the plane normal of the selected triangle to determine what direction to map. The Z axis determines the "V" direction, and the "U" direction is the vector cross product of the Z axis and the face normal of the selected triangle. Using this step, the texture always maps flat on the triangle, with no distortion, and thus the "up" direction (the Z axis) is always the same direction.

Block 210 represents the image engine 118 determining a (U,V) origin of the plane, which is where the texture starts. If the selected triangle shares a vertex with a triangle that has already been mapped, then that (U,V) is used as the origin. If the selected triangle share a vertex with several triangles, then the vertex with the minimum Z value is used. If the selected triangle contains no vertices that have already been mapped, then it uses the vertex in the lower left hand corner of the selected triangle, and determined by the coordinate system defined by the plane normal of the triangle. In addition, the scale of the (U,V) coordinates is determined by the size of the triangle.

Block 212 represents the image engine 118 performing the texture mapping function on the face of the triangle.

Once the face of the triangle has been mapped, Block 212 also represents the image engine 118 adding all of the vertices of the mapped face to the second list of vertices for triangles that have been previously mapped. As described above, the second list is then used to determine the next available triangle to process in the loop by giving preference to triangles that share a vertex with a previously processed triangle. This is what makes the wrapping process continue for the maximum possible effect.

The above steps 206–212 are repeated until all triangles within the first list are processed.

Conclusion

This concludes the description of the preferred embodiment of the invention. In summary, the present invention comprises a method, apparatus, and article of manufacture for (U,V) texture mapping of object surfaces in a 3D graphics system in such a way that the size of the texture is preserved, and the texture wraps around curved surfaces, even when the surface is scaled. One or more triangles are selected from an arbitrary mesh of triangles. A plane normal and a (U,V) origin of the plane normal is determined for each selected triangle. The surface of the selected triangle is texture mapped using the plane normal and the (U,V) origin.

The following paragraphs described some alternative ways of accomplishing the present invention. Those skilled in the art will recognize that different computer programs, operating environments, and operating systems could be substituted for those described herein. Those skilled in the art will recognize that the present invention could be used by any type of computer, and need not be limited to a personal computer. Those skilled in the art will recognize that the present invention could be used by any type of 3D graphics system, and need not be limited to the example described herein. Those skilled in the art will recognize that alternate approaches to texture mapping of surfaces could be substituted for the approach described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of mapping a texture onto a surface in a computer, comprising the steps of:

(a) selecting one or more triangles from an arbitrary mesh of triangles stored in the computer;

(b) determining a plane normal for each selected triangle;

(c) determining a (U,V) origin of the plane normal of each selected triangle; and (d) texture mapping each selected triangle using the plane normal and the (U,V) origin of the plane normal of each selected triangle, wherein the texture mapping starts at the (U,V) origin of the plane normal of each selected triangle.

2. The method of claim 1, further comprising the step of creating a first data structure from the arbitrary mesh of triangles stored in the computer, wherein the first data structure comprises a collection of distinct sets of coplanar triangles in the arbitrary mesh of triangles.

3. The method of claim 2, wherein the creating step further comprises the step of partitioning an object represented by the arbitrary mesh of triangles into distinct planes.

4. The method of claim 2, wherein the creating step further comprises the step of creating the distinct sets of co-planar triangles by computing a face normal and a constant for a plane equation for each triangle in the arbitrary mesh of triangles.

5. The method of claim 4, wherein the creating step further comprises the step of deciding whether the face normals are approximately equal using a hashing function.

6. The method of claim 2, further comprising the step of creating a second data structure that maps vertices of the triangles in the first data structure.

7. The method of claim 6, wherein the second data structure comprises a first list of triangles that have yet to be processed.

8. The method of claim 6, wherein the second data structure comprises a second list of triangles that share a vertex.

9. The method of claim 8, wherein the second list of vertices that have been previously mapped is used to determine a next available triangle to process in the first list by giving preference to triangles that share a vertex with a previously processed triangle.

10. The method of claim 6, wherein the second data structure comprises a third list of triangles in a same plane.

11. The method of claim 1, wherein the determining step (b) further comprises the step of determining a "V" direction from a Z axis of the selected triangle and a "U" direction from a vector cross product of the Z axis and a face normal for the selected triangle.

12. The method of claim 11, wherein the texture maps flat on the selected triangle with no distortion and the Z axis is always the same direction.

13. The method of claim 11, wherein the determining step (c) further comprises the step of determining whether a triangle shares a vertex with a triangle that has already been mapped and then using the (U,V) of the vertex as the origin.

14. The method of claim 11, wherein the determining step (c) further comprises the step of determining whether the selected triangle shares a vertex with a plurality of triangles that have already been mapped and then using the (U,V) of the vertex with a minimum Z value as the origin.

15. The method of claim 11, wherein the determining step (c) further comprises the step of determining whether the selected triangle shares no vertices with any triangle that has already been mapped and then using the (U,V) of one of the vertices of the triangle as the origin.

16. An article of manufacture comprising a computer program carrier readable by a computer and embodying one or more instructions executable by the computer to perform method steps of mapping a texture onto a surface in a computer, the method comprising the steps of:
   (a) selecting one or more triangles from an arbitrary mesh of triangles stored in the computer;
   (b) determining a plane normal for each selected triangle;
   (c) determining a (U,V) origin of the plane normal of each selected triangle; and
   (d) texture mapping each selected triangle using the plane normal and the (U,V) origin of the plane normal of each selected triangle, wherein the texture mapping starts at the (U,V) origin of the plane normal of each selected triangle.

17. The article of manufacture of claim 16, further comprising the step of creating a first data structure from the arbitrary mesh of triangles stored in the computer, wherein the first data structure comprises a collection of distinct sets of co-planar triangles in the arbitrary mesh of triangles.

18. The article of manufacture of claim 17, wherein the creating step further comprises the step of partitioning an object represented by the arbitrary mesh of triangles into distinct planes.

19. The article of manufacture of claim 18, wherein the creating step further comprises the step of creating the distinct sets of co-planar triangles by computing a face normal and a constant for a plane equation for each triangle in the arbitrary mesh of triangles.

20. The article of manufacture of claim 19, wherein the creating step further comprises the step of deciding whether the face normals are approximately equal using a hashing function.

21. The article of manufacture of claim 17, further comprising the step of creating a second data structure that maps vertices of the triangles in the first data structure.

22. The article of manufacture of claim 21, wherein the second data structure comprises a first list of triangles that have yet to be processed.

23. The article of manufacture of claim 21, wherein the second data structure comprises a second list of triangles that share a vertex.

24. The article of manufacture of claim 23, wherein the second list of vertices that have been previously mapped is used to determine a next available triangle to process in the first list by giving preference to triangles that share a vertex with a previously processed triangle.

25. The article of manufacture of claim 21, wherein the second data structure comprises a third list of triangles in a same plane.

26. The article of manufacture of claim 16, wherein the determining step (b) further comprises the step of determining a "V" direction from a Z axis of the selected triangle and a "U" direction from a vector cross product of the Z axis and a face normal for the selected triangle.

27. The article of manufacture of claim 26, wherein the texture maps flat on the selected triangle with no distortion and the Z axis is always the same direction.

28. The article of manufacture of claim 26, wherein the determining step (c) further comprises the step of determining whether a triangle shares a vertex with a triangle that has already been mapped and then using the (U,V) of the vertex as the origin.

29. The article of manufacture of claim 16, wherein the determining step (c) further comprises the step of determining whether the selected triangle shares a vertex with a plurality of triangles that have already been mapped and then using the (U,V) of the vertex with a minimum Z value as the origin.

30. The article of manufacture of claim 16, wherein the determining step (c) further comprises the step of determining whether the selected triangle shares no vertices with any triangle that has already been mapped and then using the (U,V) of one of the vertices of the triangle as the origin.

31. A computer implemented apparatus for mapping a texture onto a surface, comprising:
   (a) a computer with a memory attached thereto;
   (b) means, performed by the computer, for selecting one or more triangles from an arbitrary mesh of triangles stored in the computer;
   (c) means, performed by the computer, for determining a plane normal for each selected triangle;
   (d) means, performed by the computer, for determining a (U,V) origin of the plane normal of each selected triangle; and
   (e) means, performed by the computer, for texture mapping each selected triangle using the plane normal and the (U,V) origin of the plane normal of each selected triangle, wherein the texture mapping starts at the (U,V) origin of the plane normal of each selected triangle.

32. The computer implemented apparatus of claim 31, further comprising means, performed by the computer, for creating a first data structure from the arbitrary mesh of triangles stored in the computer, wherein the first data structure comprises a collection of distinct sets of coplanar triangles in the arbitrary mesh of triangles.

33. The computer implemented apparatus of claim 32, wherein the means for creating further comprises means for partitioning an object represented by the arbitrary mesh of triangles into distinct planes.

34. The computer implemented apparatus of claim 32, wherein the means for creating further comprises means for creating the distinct sets of co-planar triangles by computing a face normal and a constant for a plane equation for each triangle in the arbitrary mesh of triangles.

35. The computer implemented apparatus of claim 34, wherein the means for creating further comprises means for deciding whether the face normals are approximately equal using a hashing function.

36. The computer implemented apparatus of claim 32, further comprising means, performed by the computer, for creating a second data structure that maps vertices of the triangles in the first data structure.

37. The computer implemented apparatus of claim 36, wherein the second data structure comprises a first list of triangles that have yet to be processed.

38. The computer implemented apparatus of claim 36, wherein the second data structure comprises a second list of triangles that share a vertex.

39. The computer implemented apparatus of claim 38, wherein the second list of vertices that have been previously mapped is used to determine a next available triangle to process in the first list by giving preference to triangles that share a vertex with a previously processed triangle.

40. The computer implemented apparatus of claim 36, wherein the second data structure comprises a third list of triangles in a same plane.

41. The computer implemented apparatus of claim 31, wherein the means for determining (b) further comprises means, performed by the computer, for determining a "V" direction from a Z axis of the selected triangle and a "U" direction from a vector cross product of the Z axis and a face normal for the selected triangle.

42. The computer implemented apparatus of claim 41, wherein the texture maps flat on the selected triangle with no distortion and the Z axis is always the same direction.

43. The computer implemented apparatus of claim 41, wherein the means for determining (c) further comprises means, performed by the computer, for determining whether a triangle shares a vertex with a triangle that has already been mapped and then using the (U,V) of the vertex as the origin.

44. The computer implemented apparatus of claim 41, wherein the means for determining (c) further comprises means, performed by the computer, for determining whether the selected triangle shares a vertex with a plurality of triangles that have already been mapped and then using the (U,V) of the vertex with a minimum Z value as the origin.

45. The method of claim 41, wherein the means for determining (c) further comprises means, performed by the computer, for determining whether the selected triangle shares no vertices with any triangle that has already been mapped and then using the (U,V) of one of the vertices of the triangle as the origin.

\* \* \* \* \*